US007043809B1

(12) United States Patent
Latiri

(10) Patent No.: US 7,043,809 B1
(45) Date of Patent: May 16, 2006

(54) HEAD-TO-SHAFT SEPARATION TOOL FOR GOLF CLUBS

(76) Inventor: Mondher Latiri, 781 Fong Lin Road, Ta-Liao, 831, Kaohsiung (TW)

( * ) Notice: Subject to any disclaimer, the term of this patent is extended or adjusted under 35 U.S.C. 154(b) by 0 days.

(21) Appl. No.: 11/097,906

(22) Filed: Apr. 4, 2005

(51) Int. Cl.
*B23P 19/04* (2006.01)

(52) U.S. Cl. ......................... 29/252; 29/281.5; 29/239; 29/281.1; 29/256

(58) Field of Classification Search .................. 29/252, 29/281.5, 263, 270, 257, 281.1, 238, 239
See application file for complete search history.

(56) References Cited

U.S. PATENT DOCUMENTS

| | | | | |
|---|---|---|---|---|
| 2,160,395 | A | 5/1939 | Wettlaufer | |
| 4,586,695 | A | 5/1986 | Miller | |
| 4,783,893 | A | 11/1988 | Farino | |
| 4,899,430 | A | 2/1990 | Farino | |
| 4,901,418 | A | 2/1990 | Machado et al. | |
| 4,910,849 | A | 3/1990 | Marshall | |
| 5,137,243 | A | 8/1992 | Stevens et al. | |
| 5,687,464 | A | 11/1997 | Marshall | |
| 5,722,140 | A | 3/1998 | Marshall | |
| 5,839,181 | A * | 11/1998 | Chu | 29/281.5 |
| 6,336,263 | B1 | 1/2002 | Weiss et al. | |
| 6,398,186 | B1 | 6/2002 | Lemoine | |
| 6,449,823 | B1 | 9/2002 | Krapp | |
| 6,854,170 | B1 * | 2/2005 | D'Aguanno | 29/239 |
| 2001/0047577 | A1 | 12/2001 | Krapp | |
| 2004/0134057 | A1 | 7/2004 | Samchisen | |

FOREIGN PATENT DOCUMENTS

| | | |
|---|---|---|
| JP | 9-075488 | 3/1997 |

OTHER PUBLICATIONS

Photographs provided by applicant of hydraulically actuated golf club head-to-shaft removal tool used by Dunlop Golf/ Sumitomo Rubber Industries, 16 photos, dated Mar. 2, 2005.

* cited by examiner

*Primary Examiner*—Lee D. Wilson
(74) *Attorney, Agent, or Firm*—Richard C. Litman

(57) ABSTRACT

The head-to-shaft separation tool for golf clubs includes an automatically adjusting shaft grip assembly and an automatically adjusting hosel stop at the club head retaining bracket. The device comprises a base with a frame extending substantially normal thereto. A hydraulic jack, e.g., bottle jack, extends from the base, with its extension axis substantially parallel to the frame. A club shaft grip assembly slides in a slot through the frame, with a transfer fixture transferring force from the jack to the shaft grip assembly. The club head is retained by the fixed club head retaining bracket, while the shaft grip assembly automatically closes on the club shaft as it is moved away from the club head retaining bracket. Heat is applied to break the adhesive bond between the shaft and club head, with the tensile force applied by the present device separating the shaft from the club head.

20 Claims, 5 Drawing Sheets

HEAD-TO-SHAFT SEPARATION TOOL FOR GOLF CLUBS

BACKGROUND OF THE INVENTION

1. Field of the Invention

The present invention relates generally to golf club tools and devices. More particularly, the present invention comprises a tool for separating (pulling) the shaft from the head of a golf club for maintenance, repair, or replacement of either the shaft or club head.

2. Description of the Related Art

As the game of golf has become more popular, the equipment used in the game has become more and more specialized. Different club head angles (lofts) and materials (wood, metal) for different playing situations are, of course, well known. However, more subtle differences have been developed, even among club heads of specific material and face angle. When different shaft lengths and materials are considered as well, it will be seen that there are myriad different combinations of club heads and shafts that may be used in the game.

In many instances, a player may wish to modify or upgrade a club or club set by exchanging or replacing one or more shafts on existing club heads, or replacing the head of the club. Such equipment is also prone to damage during use, and from time to time a damaged shaft or club head may have to be removed from its counterpart component. Also, misalignment or improper assembly may occur from time to time during club manufacture. Rather than discard the entire assembly, the separation of the improperly assembled shaft and club head permits the components to be reassembled properly.

Golf club heads and shafts are nearly universally assembled by inserting the head attachment end of the shaft into a hosel or socket provided in, or extending from, the club head. Immovable attachment is assured by using an adhesive, nearly universally an epoxy, in the joint. As can be seen from the above description of the club head and shaft assembly, the separation of the two components requires specialized equipment capable of applying a relatively large tensile force to either the club shaft or to the club head, even after breaking down the adhesive bond between the two components.

Accordingly, a number of different golf club head and shaft separation tools and devices have been developed in the past. All such devices include a mechanism for gripping the club shaft and/or head, and for applying a tensile force between the shaft and head. Heat is applied to the club head hosel and/or to the shaft adjacent the hosel to break down the epoxy adhesive bond as the tensile force is applied, with sufficient tensile force finally overcoming the mechanical and remaining weakened adhesive bond to separate the two components.

Most such devices utilize a mechanical threaded jack-screw arrangement to provide the required tensile force. An example of such is found in Japanese Patent No. 9-075,488, published on Mar. 25, 1997, the English title reading "Head Removing Device For Golf Club." According to the single drawing provided and the English abstract, a compression spring is disposed between a shaft clamp and a component which bears against the club head hosel. When a bolt which passes through the spring and lower portion of the shaft clamp is loosened, the spring expands to push the club head from the end of the shaft.

However, a few golf club head/golf club shaft separation devices utilize a hydraulic actuator to apply the required separation force. Other hydraulic devices either (1) orient the club head and shaft to limit the bench mounting options and/or portability for the device, (2) require an external source of hydraulic pressure, (3) fail to provide a universal shaft grip for different diameters of club shafts, (4) fail to provide a universal club head hosel stop or grip component adaptable to different sizes and configurations of club heads and hosels, and/or (5) differ in other respects from the present head-to-shaft separation tool for golf clubs.

Thus, a head-to-shaft separation tool for golf clubs solving the aforementioned problems is desired.

SUMMARY OF THE INVENTION

The head-to-shaft separation tool for golf clubs comprises a base with a shaft grip support frame extending normal thereto. A hydraulic jack or press, e.g., a conventional bottle jack, is attached to the base, with the ram extension axis substantially parallel to the plane of the support frame. A club shaft grip assembly slides in a slot in the frame, with a jack extension transfer fixture extending from the jack pad and attaching to the shaft grip assembly to transfer the extension force of the jack to the shaft grip assembly. A fixed club head retaining bracket extends from the frame below the club shaft grip assembly.

The device is used by placing the club shaft within the shaft grip assembly, with the club head or hosel contacting the club head retaining bracket below the shaft grip assembly. The club head retaining bracket includes automatic adjustment for the diameter of the club head hosel and club head attachment end of the shaft. When hydraulic pressure is applied to the jack, the shaft grip assembly automatically closes on the shaft, with greater force applied to the jack resulting in greater grip of the shaft grip assembly on the shaft. Heat is applied to weaken the adhesive bond between the shaft and club head hosel to exert sufficient force to break loose the weakened bond between the club head and shaft to allow for replacement or repair of the shaft or head individually.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a hydraulic tool for separating the head and shaft of a golf club assembly. The device includes a shaft-gripping component, which grips the golf club shaft more firmly as increasing tension is applied to the club assembly, and a club head stop, which adjusts automatically for the diameters of the club shaft and club head hosel.

Figure 1:
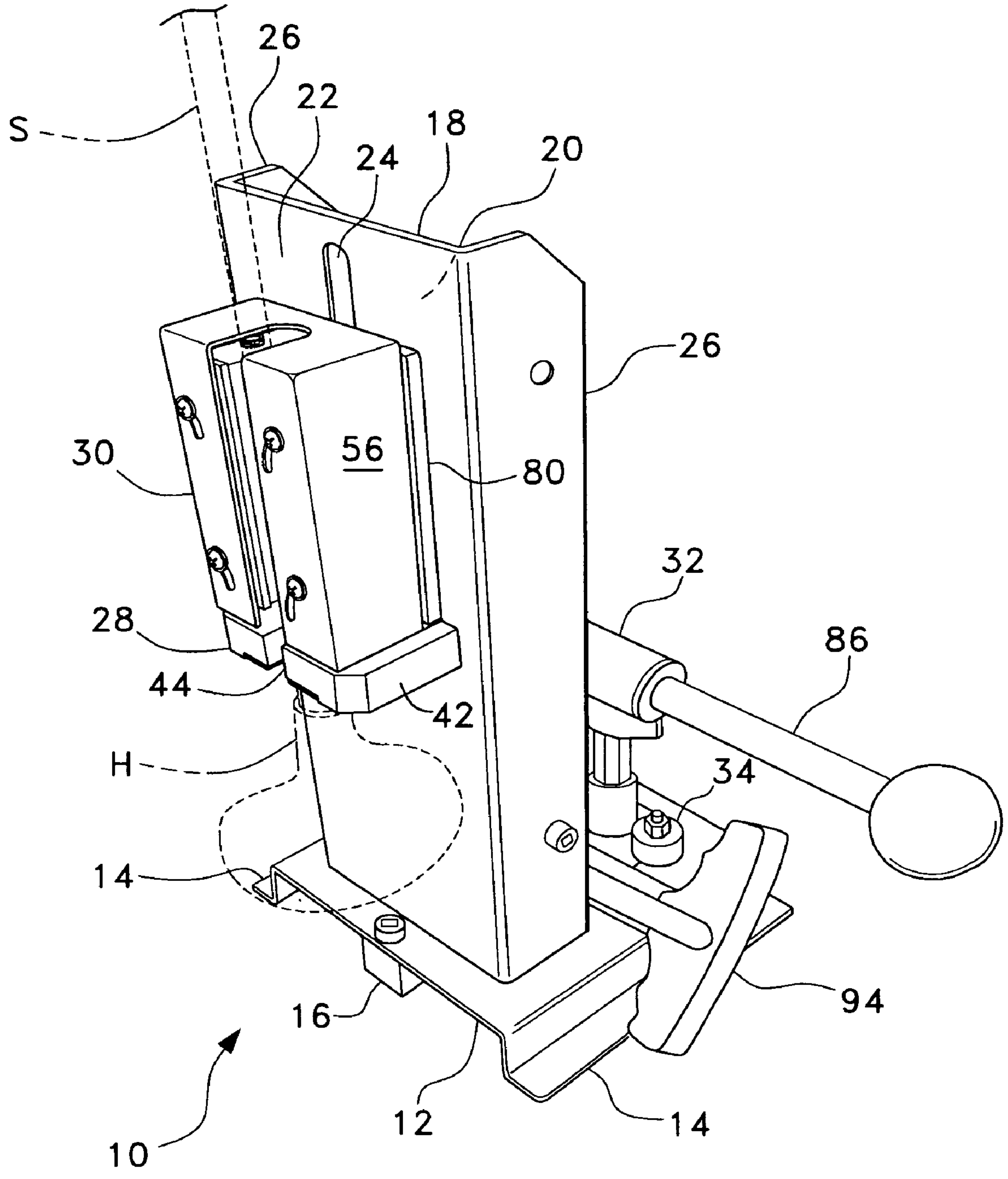
FIG. 1 is a perspective view of a head-to-shaft separation tool for golf clubs according to the present invention, showing its general configuration and features.
Figure 2:
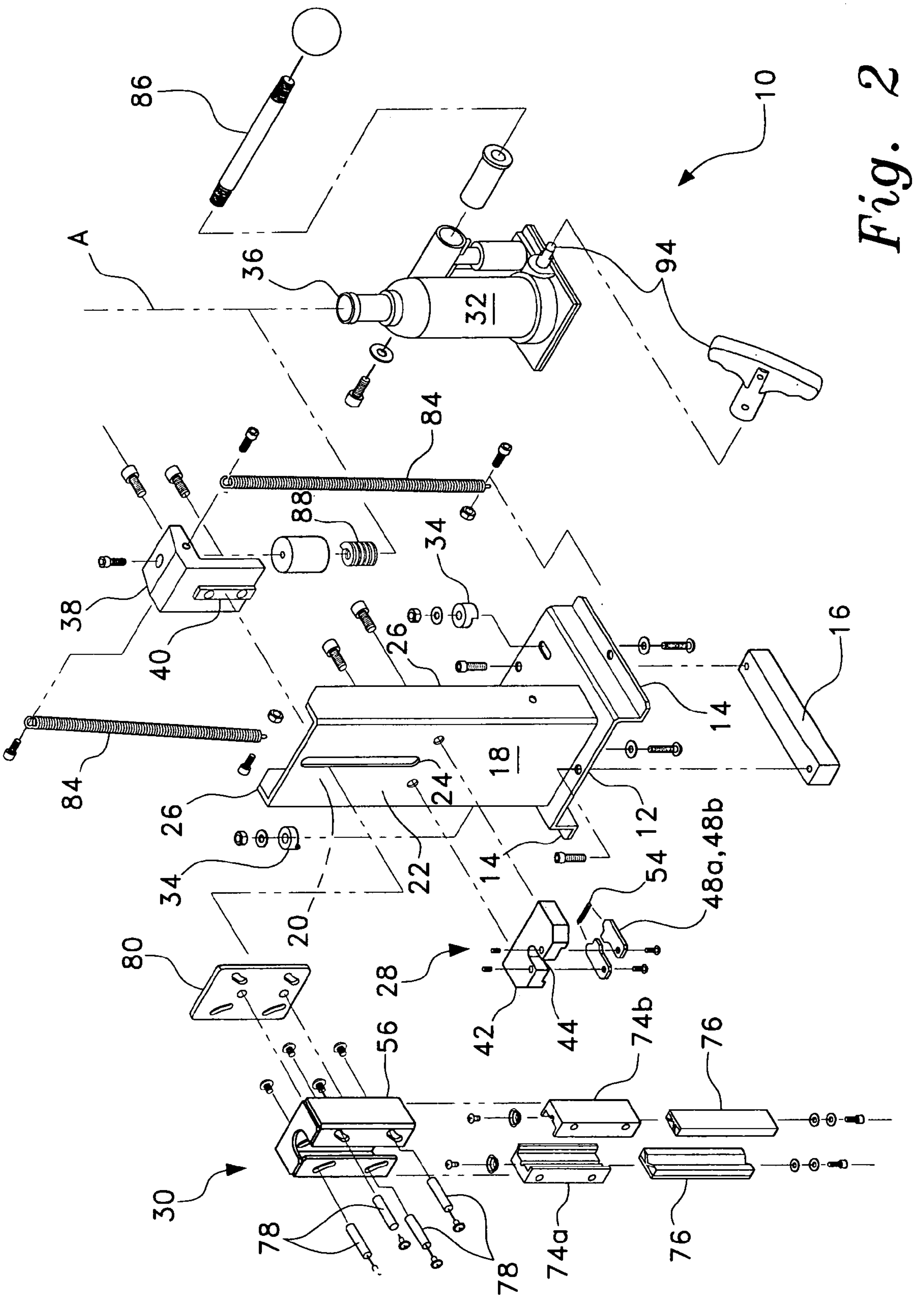
FIG. 2 is an exploded perspective view of a head-to-shaft separation tool according to the present invention, illustrating details of the various components of the present device.

FIG. 1 provides a perspective view of the present head and shaft separation tool, with FIG. 2 providing an exploded perspective view of the various components of the tool. The tool 10 includes a generally planar base plate 12, which may include opposed support flanges 14 and a central support or brace 16, if so desired.

A support frame 18 extends generally normal to the base plate 12, with the frame 18 having a jack side 20 (facing and adjacent to the hydraulic jack of the device) and an opposite club shaft side 22 (facing and adjacent to the shaft S of a golf club when the device 10 is in use, as shown in FIG. 1). The frame 18 also includes a guide slot 24 formed therethrough, described further below, and may include opposed lateral stiffening flanges 26 as required or desired.

A club head stop bracket assembly 28 is immovably affixed (e.g., bolted, welded, etc.) to the club shaft side 22 of the support frame 18 between the guide slot 24 and the base plate 12. The club head stop bracket assembly 28 includes a club shaft clearance slot defined therein, with the operation of the club head stop bracket assembly 28 being described in greater detail further below.

A club shaft grip assembly 30 slides upon the club shaft side 22 of the support frame 18 and over the guide slot 24 therein, and serves to grip a golf club shaft within a channel formed in the grip assembly 30. The shaft grip assembly 30 is configured to provide an ever tighter grip upon a golf club shaft S placed therein as increasing tensile force is applied to the grip assembly 30 to pull it away from the club head stop bracket assembly 28. A detailed description of the shaft grip assembly 30 and its operation is provided further below.

Operative force for the device 10 is provided by a hydraulic jack 32, e.g., a conventional self-contained "bottle jack" or the like. The jack 32 is secured to the base plate 12 by clamp assemblies 34 or other suitable means. The jack 32 has a lifting pad 36 and defines an extension axis A, which is essentially parallel to the support frame 18, in order to transfer force from the jack 32 to the golf club shaft grip assembly 30 through the slot 24 in the frame 18, as described further below.

Force is transferred from the jack 32 to the club shaft grip assembly 30 by means of a jack force transfer fixture 38, shown in FIG. 2. The transfer fixture 38 rests atop the jack pad 36 and has a guide boss 40 which extends laterally through the slot 24 of the support frame 18 to immovably attach (bolt, etc.) to the club shaft grip assembly 30, essentially capturing the support frame 18 between the transfer fixture 38 and the club shaft grip assembly 30. As the jack 32 is extended, the transfer fixture 38 is raised, which, in turn, slides guide boss 40 within the slot 24 of the support frame 18 and pulls the club shaft grip assembly 30 away from the club head stop assembly 28.

Figure 3:
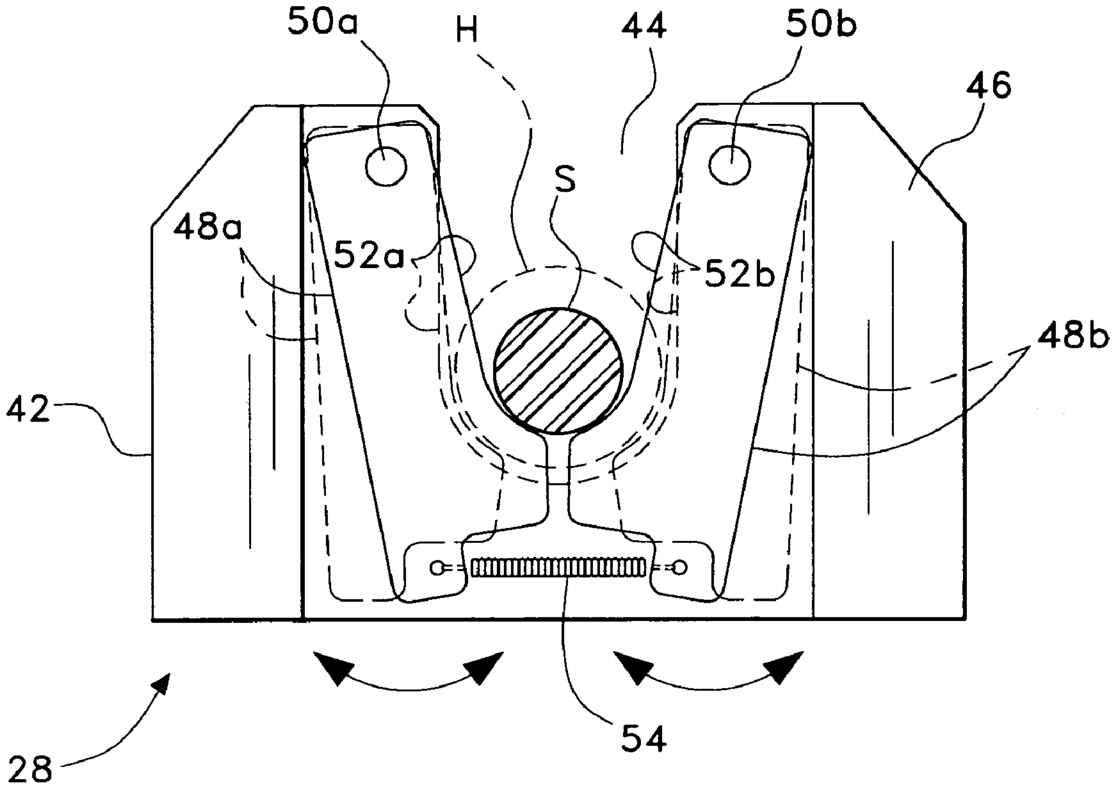
FIG. 3 is a bottom plan view of the adjustable hosel stop jaws of the club head and hosel stop plate assembly, showing their operation.

The club head stop bracket assembly 28 includes means for adjusting for different club shaft diameters and club head hosels in order to retain the club head and prevent the head from following the club shaft grip assembly 30 as the assembly 30 moves away from the stop bracket assembly 28. FIG. 3 provides a bottom plan view of the club head stop bracket assembly 28, illustrating the operation thereof. The bracket assembly 28 includes a club head stop block 42 having a central golf club shaft clearance slot 44 formed therein. The club head face 46, oriented toward the base plate 12 of the device in the finished assembly, includes laterally opposed first and second hosel stop plates 48*a* and 48*b* attached thereto by respective pivots 50*a* and 50*b* disposed adjacent each side of the mouth of the club shaft clearance slot 44.

Each of the hosel stop plates 48*a*, 48*b* includes a shaft clearance relief therein, respectively 52*a* and 52*b*. A tensile closure spring 54 extends between the distal ends of the two stop plates 48*a*, 48*b*, opposite their pivots 50*a*, 50*b*. The closure spring 54 draws the two stop plates 48*a*, 48*b* toward one another at their distal ends to approximate closely about the shaft S of a golf club placed therein. The adjustability of the stop plates 48*a*, 48*b* assures that they will fit closely about golf club shafts S of various diameters. However, the closure spring 54 draws the two hosel stop plates 48*a*, 48*b* closely about the club shaft S, preventing the larger diameter hosel H or club head from passing between the two plates. Thus, as tensile force is applied to the club shaft S to withdraw it from the club head hosel H, the head and hosel H are restricted from following the club shaft grip assembly 30 as it moves along the slot 24 of the frame 18 during operation.

Figure 4A:
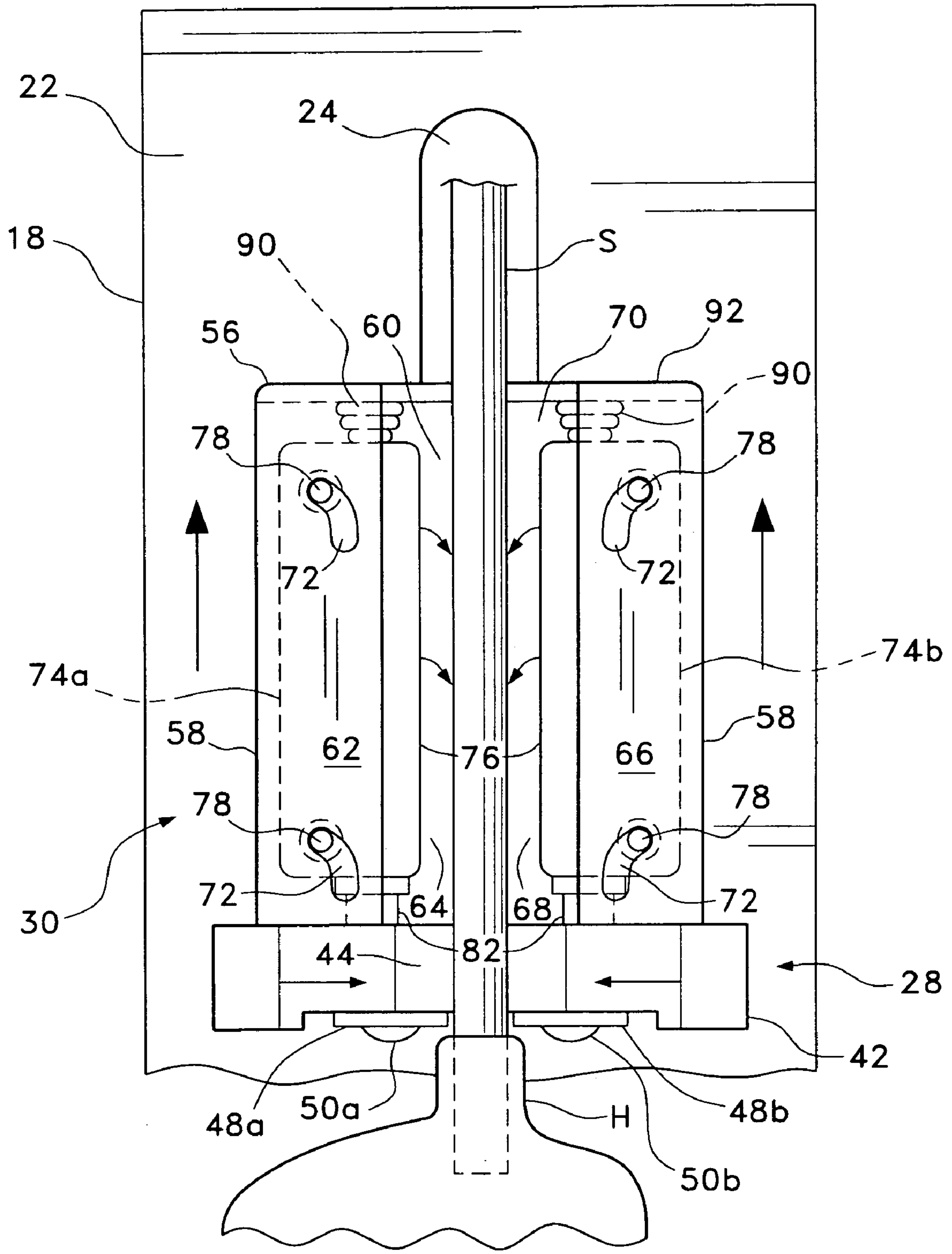
FIG. 4A is an environmental elevation view of the club shaft clamp assembly in its initial or lowered state.
Figure 4B:
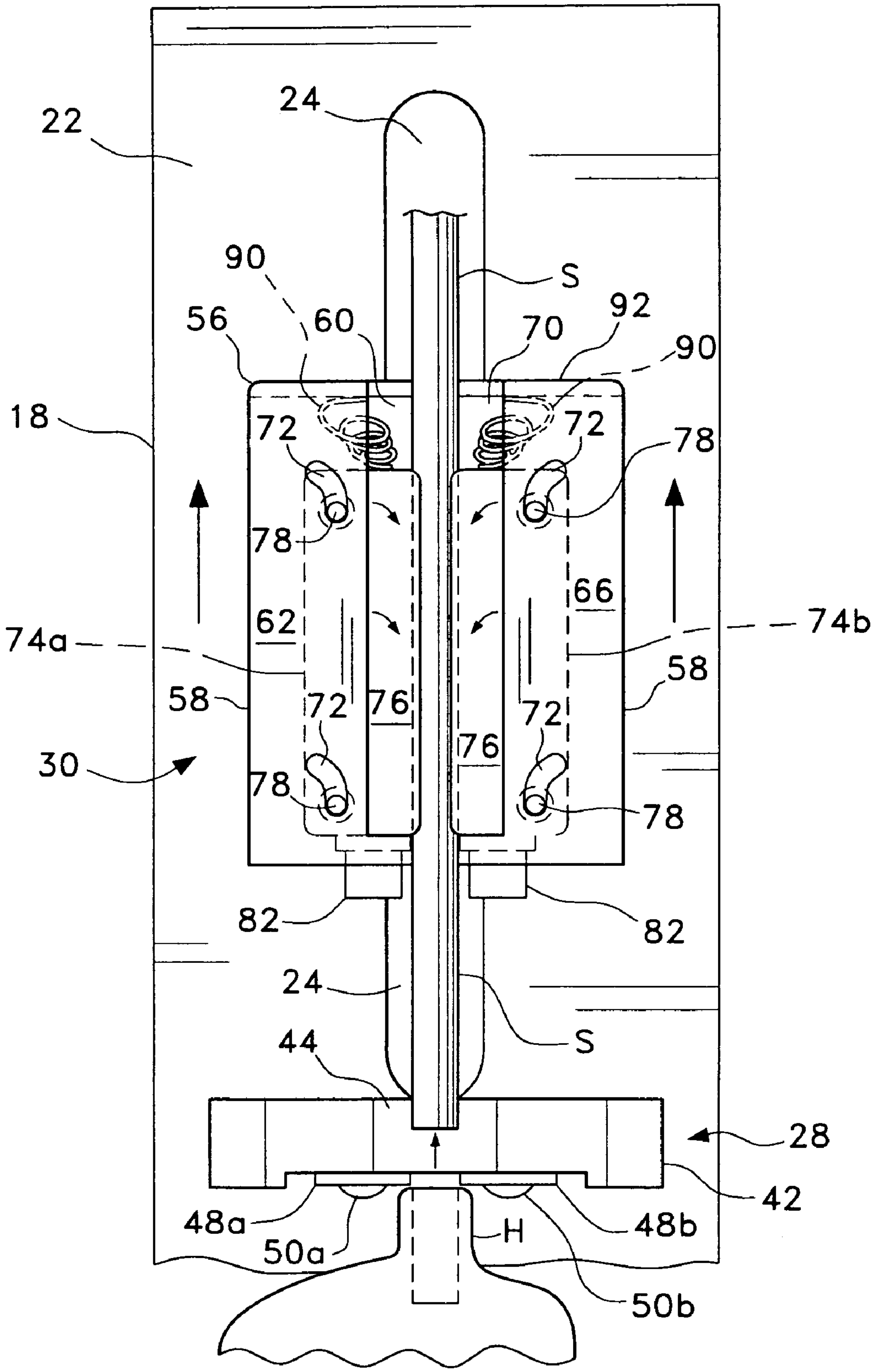
FIG. 4B is an environmental elevation view of the club shaft clamp assembly in its lifted state, with the shaft clamps securing the club shaft therein to remove the shaft from the club head.

FIGS. 4A and 4B provide detailed elevation views of the operation of the club shaft grip assembly 30, with FIG. 4A showing the initial placement of a golf club shaft S within the grip assembly 30 prior to applying tensile force to the shaft, and FIG. 4B showing the position of the assembly 30 and its gripping jaws after actuation of the jack 32. The grip assembly 30 includes a jaw housing 56 having a front plate 58 and a back or frame attachment plate 60. Each plate 58 and 60 comprises a first side 62 and 64, respectively, and an opposite second side 66 and 68, respectively. The back plate 60 is a continuous, unbroken sheet of material, but the two sides 62 and 66 of the front plate 58 are divided or separated by a club shaft slot or channel 70 therebetween.

Each side of the front and back plates 58 and 60 include a pair of cam slots 72 (upper and lower) formed therethrough. While the cam slots 72 are only clearly shown in the front or outer plate 58 in the orthographic views of FIGS. 4A and 4B, it will be understood that they are provided through both the front plate 58 and parallel rear plate 60. The cam slots 72 extend generally diagonally inwardly toward the central club shaft slot 70 and toward the club head stop bracket assembly 28. The cam slots 72 are preferably curved, with their convexities oriented generally toward the center of the jaw housing 56 and the central club shaft slot 70 in the front plate 58. This curvature of the slots 72 provides certain mechanical advantages in operation of the device, as explained further below.

Opposite first and second shaft gripping jaws 74*a* and 74*b* are adjustably positioned within each side of the jaw housing 56, between the front and back plates 58 and 60. The two jaws 74*a*, 74*b* preferably include some form of resilient cushioning material 76 thereon, e.g., firm rubber padding, etc., to avoid damage to a golf club shaft gripped therebetween. The two jaws 74*a*, 74*b* are secured in place within the housing 56 by a series of jaw locating pins 78, which pass through their respective jaws 74*a*, 74*b* with their ends captured within corresponding ones of the cam slots 72. Thus, the two jaws 74*a*, 74*b* can move toward one another and toward the club head stop bracket assembly 28, or oppositely away from one another and away from the stop bracket assembly, as the jaw locating pins 78 slide in their respective cam slots 72. The pins 78 are secured in place by bolts or screws, the heads of which protrude beyond the front and back plates 58 and 60 of the housing 56. Accordingly, a spacer plate 80 (shown in FIGS. 1 and 2) may be provided between the back plate 60 of the housing 56 and the club shaft side 22 of the frame 18 upon which the housing 56 slides. The spacer plate 80 may be provided with an identical slot configuration to the front and rear plates 58 and 60 of the housing 56, as shown, or other clearance geometry provided as desired.

The two club shaft gripping jaws 74*a*, 74*b* are initially relatively widely spaced from one another when pressure is released from the jack 32 and the club shaft grip assembly 30 is moved to lie immediately adjacent to, and in contact with, the club head stop bracket assembly 28. This is due to a stop or bumper 82 installed in the stop bracket contact end of each of the club shaft gripping jaws 74*a*, 74*b*. The stops or bumpers 82 initially contact the adjacent club head stop block when pressure is released in the jack 32 and the club shaft grip assembly 30 moves toward the stop bracket assembly 28. One or more tensile jack retraction springs 84 (preferably a pair, for symmetry, as shown in the exploded view of FIG. 2) extend between the jack force transfer fixture 38 and the side flanges 26 of the support frame 18, to retract the jack 32 when hydraulic pressure is released. This enables the mechanism to be installed in any practicable orientation as desired, e.g., vertically, horizontally across a workbench, etc., as desired, without regard to gravitational forces.

The initial contact of the stops or bumpers 82 against the club head stop block 42 stops the movement of the two jaws 74*a*, 74*b* toward the stop block 42 before the club shaft grip housing 56 reaches the stop block 42. The resulting relative motion between the housing 56 and the stationary jaws 74*a*, 74*b* results in the two jaws spreading apart from one another as their locating pins 78 travel upwardly and outwardly in their respective cam slots 72, thus opening the jaws 74*a*, 74*b* to provide for the insertion of a golf club shaft S therebetween.

The device 10 is used by placing a golf club shaft S within the club shaft channel 70 of the club shaft grip assembly 30 with the club head extending therebelow, generally as shown in FIGS. 1, 4A, and 4B. The hosel H of the club head is positioned with its distal or shaft insertion opening end against the two hosel stop plates 48*a* and 48*b*, as shown in FIG. 4A. The two plates 48*a* and 48*b* swivel or pivot inwardly toward one another due to the spring 54 (FIG. 3), to fit closely about the club shaft S and preclude passage of the larger diameter hosel H therebeyond.

The jack handle 86 is then actuated to extend the jack 32, thus moving the club shaft grip assembly 30 away from the fixed club head stop bracket assembly 28 by means of the jack force transfer fixture 38 affixed to the stop bracket assembly 28 and resting atop the jack pad 36. A compression spring 88 (shown in FIG. 2) may be disposed between the jack pad 36 and transfer fixture 38, if so desired. This spring 88 serves to provide a biasing force to the club shaft grip assembly 30 by means of the transfer fixture 38 whenever the hydraulic jack 32 has been pressurized and a golf club assembly has been installed in the device, thereby freeing the user from the need to maintain constant pressure on the jack handle 86.

As the club shaft grip assembly 30 is drawn away from the club head stop bracket assembly 28, the two club shaft gripping jaws 74*a*, 74*b* move inwardly toward one another to grip the club shaft S securely therebetween. Positive motion of the jaws 74*a*, 74*b* toward one another is assured by a compression spring 90 disposed between the upper wall or panel 92 of the club shaft jaw housing 56 and the adjacent end of each club shaft gripping jaw 74*a*, 74*b*. As the club shaft grip assembly 30 moves away from the fixed club head stop bracket assembly 28 when the jack 32 is actuated, the springs 90 push the two jaws 74*a*, 74*b* toward the club head stop bracket assembly 28. This results in movement of the two jaws 74*a*, 74*b* toward one another as the jaw locating pins 78 travel in their respective cam slots 72, thereby securely gripping a golf club shaft S placed therebetween. The arcuate curvature of the cam slots 72 results in a shallower slope for the inner portions of the slots, thereby providing a greater wedging action against the club shaft S as greater tensile force is applied to the club shaft grip assembly when greater hydraulic pressure is applied by means of the jack 32.

Once the jack pad compression spring 88 has been compressed, heat is applied to the golf club hosel H area to break down the adhesive bond between the attachment end of the club shaft S and the hosel H. Additional tensile force can be brought to bear on the club shaft and hosel joint by applying additional pressure to the jack handle 86, as required. The relatively high pressure which is achievable by means of the hydraulic jack 32, in combination with the heat applied to the club shaft and hosel joint, serves to weaken the joint to the point where the club shaft will pull out of the hosel, as shown in FIG. 4B.

Once the two components have been separated, tension is released on the assembly and the club shaft may be pulled away from the club head stop bracket assembly 28 and outwardly from the shaft gripping jaws 74*a*, 74*b*. Releasing pressure on the jack 32 by means of the conventional hydraulic pressure release valve and handle 94 (shown in FIGS. 1 and 2) and repositioning the club shaft grip assembly 30 so the jaw stops or bumpers 82 contact the club head stop block 42, results in the jaws 74*a*, 74*b* spreading as the jaw housing 56 continues to move toward the stop block 42, thereby allowing the club shaft S to be removed from between the jaws 74*a*, 74*b* if the shaft was not removed earlier. Once the jaw housing has been repositioned in contact with the adjacent stop block 42, the device is once again ready for use.

In conclusion, the present head-to-shaft separation tool for golf clubs, greatly facilitates the operation of removing a golf club shaft from a golf club head or hosel. The use of a conventional hydraulic jack to provide the operative force for the device results in extremely high forces being achievable with the present tool. The gripping power of the two shaft gripping jaws of the present device, increases as increasing tensile force is applied to the assembly by means of the conventional hydraulic jack used in the device. The two pivotally attached hosel stop plates assure that virtually any club shaft diameter and hosel diameter may be accommodated in the present device. The use of springs to urge the two shaft gripping jaws together and to draw the shaft grip assembly toward the club head stop bracket assembly when hydraulic pressure is released allows the device to be mounted in any orientation as desired. The device may be mounted or attached to any horizontal surface without need for clearance for a depending club shaft, as the shaft extends upwardly from the device when it is secured with the jack and support frame oriented vertically. Alternatively, the device may be mounted with the jack and support frame oriented horizontally, if so desired, with operation being the same regardless of the orientation due to the return springs used in the device.

The present separation tool is thus extremely easy and quick to use, and its sturdy structure and use of a conventional hydraulic jack as the operative force producer assure that the device will prove to be quite durable and capable of providing years of service with little or no maintenance. The lack of any specific club head gripping means allows work to be performed on virtually any type of club having separable head and shaft components, including so-called “wood” heads whether actually formed primarily of wood or formed of metal or other material(s), or “iron” heads, i.e., smaller club heads formed of steel or other suitable metal. Accordingly, the present club head and shaft separation tool will prove to be quite valuable to owners and operators of golf pro shops, golf club manufacturers and persons who make and modify custom golf clubs, and others who have need of such a tool.

It is to be understood that the present invention is not limited to the embodiment described above, but encompasses any and all embodiments within the scope of the following claims.

I claim:

1. A head-to-shaft separation tool for golf clubs, comprising:

a base plate;

a support frame extending substantially normal to said base plate, said support frame having a jack side, a club shaft side opposite the jack side, and a guide slot formed therethrough;

a club head stop bracket immovably affixed to the club shaft side of said support frame between the guide slot and said base plate;

a club shaft grip assembly slidably disposed upon the club shaft side of said support frame adjacent the guide slot;

a hydraulic jack extending from said base plate adjacent the jack side of said support frame, said jack having a lifting pad and defining an extension axis substantially parallel to said support frame; and a jack force transfer fixture slidably disposed within the guide slot of said support frame and affixed to said club shaft grip assembly, the fixture extending between said jack and said club shaft grip assembly.

2. The head-to-shaft separation tool for golf clubs according to claim 1, wherein said club shaft grip assembly comprises:

a jaw housing having a front plate and a back plate, each of the plates having a first side and a second side, the front plate further having a club shaft slot separating the first side and the second side, each of the sides of the plates having a pair of cam slots formed therethrough, the cam slots extending generally diagonally inwardly and toward said club head stop bracket;

first and second mutually opposed shaft gripping jaws adjustably disposed within said jaw housing, between the front plate and the back plate; and a pair of jaw-locating pins disposed through each of said jaws and through corresponding ones of the cam slots; whereby movement of said shaft gripping jaws within said jaw housing and towards said club head stop bracket results in movement of said jaws toward one another, thereby securely gripping a golf club shaft placed therebetween.

3. The head-to-shaft separation tool for golf clubs according to claim 2, further including a compression spring disposed between each of said shaft gripping jaws and said housing, urging said jaws toward one another.

4. The head-to-shaft separation tool for golf clubs according to claim 2, further including club shaft protective cushioning material disposed upon each of said jaws.

5. The head-to-shaft separation tool for golf clubs according to claim 1, wherein said stop bracket has a club shaft slot disposed therein and a club head face disposed toward said base, the tool further comprising:

first and second hosel stop plates pivotally disposed upon the club head face of said stop bracket; and a closure spring disposed between said hosel stop plates, urging said stop plates to a closed state; whereby said stop plates close about a golf club shaft by means of said closure spring, stopping movement of a golf club head and hosel beyond said stop plates as tension is applied to the golf club shaft.

6. The head-to-shaft separation tool for golf clubs according to claim 1, further including a compression spring disposed between the lifting pad of said jack and said jack force transfer fixture.

7. The head-to-shaft separation tool for golf clubs according to claim 1, further including at least one tensile retraction spring disposed between said jack force transfer fixture and said support frame, urging said jack to a retracted state.

8. A head-to-shaft separation tool for golf clubs, comprising:

a base plate;

a support frame extending from said base plate;

a hydraulic jack extending from said base plate, said jack having at least a lifting pad and defining an extension axis substantially parallel to said support frame;

a club shaft grip assembly slidably disposed upon said support frame and mechanically communicating with said jack, the assembly having:

a jaw housing having a front plate and a back plate, each of the plates having a first side and a second side, the front plate having a club shaft slot separating the first side and the second side, each of the sides of the plates having a pair of cam slots formed therethrough, the cam slots extending generally diagonally inwardly and generally toward said base plate;

first and second mutually opposed shaft gripping jaws adjustably disposed within said jaw housing, between the front plate and the back plate; and a pair of jaw-locating pins disposed through each of said jaws and through corresponding ones of the cam slots; whereby movement of said shaft gripping jaws within said jaw housing and generally toward said base plate results in movement of said jaws toward one another, thereby securely gripping a golf club shaft placed therebetween.

9. The head-to-shaft separation tool for golf clubs according to claim 8, wherein said support frame is substantially normal to said base plate and has a jack side, a club shaft side opposite the jack side, and a guide slot formed therethrough, the tool further comprising:

a club head stop bracket affixed to the club shaft side of said support frame between the guide slot and said base plate; and a jack force transfer fixture slidably disposed within the guide slot of said support frame, the fixture being affixed to said club shaft grip assembly and extending between said jack and said club shaft grip assembly.

10. The head-to-shaft separation tool for golf clubs according to claim 9, wherein said stop bracket has a club shaft slot disposed therein and a club head face disposed toward said base, the tool further comprising:

first and second hosel stop plates pivotally disposed upon the club head face of said stop bracket; and a closure spring disposed between said hosel stop plates, urging said stop plates to a closed state; whereby said closure spring urge said stop plates to close about a golf club shaft, stopping movement of a golf club head and hosel beyond said stop plates as tension is applied to the golf club shaft.

11. The head-to-shaft separation tool for golf clubs according to claim 9, further including a compression spring disposed between the lifting pad of said jack and said jack force transfer fixture.

12. The head-to-shaft separation tool for golf clubs according to claim 9, further including at least one tensile retraction spring disposed between said jack force transfer fixture and said support frame, urging said jack to a retracted state.

13. The head-to-shaft separation tool for golf clubs according to claim 8, further including a compression spring disposed between each of said shaft gripping jaws and said housing, urging said jaws toward one another.

14. The head-to-shaft separation tool for golf clubs according to claim 8, further including club shaft protective cushioning material disposed upon each of said jaws.

15. A head-to-shaft separation tool for golf clubs, comprising:

a base plate;

a support frame extending from said base plate;

a hydraulic jack extending from said base plate, said jack having at least a lifting pad and defining an extension axis substantially parallel to said support frame;

a club shaft grip assembly slidably disposed upon said support frame and mechanically communicating with said jack;

a club head stop bracket affixed to said support frame, said stop bracket having a club shaft slot disposed therein and a club head face disposed toward said base;

first and second hosel stop plates pivotally disposed upon the club head face of said stop bracket; and a closure spring disposed between said hosel stop plates, urging said stop plates to a closed state; whereby said stop plates close about a golf club shaft by means of said closure spring, stopping movement of a golf club head and hosel beyond said stop plates as tension is applied to the golf club shaft.

16. The head-to-shaft separation tool for golf clubs according to claim 15, wherein said support frame is substantially normal to said base plate and has a jack side, a club shaft side opposite the jack side, and a guide slot formed therethrough, the tool further comprising a jack force transfer fixture slidably disposed within the guide slot of said support frame, the fixture being affixed to said club shaft grip assembly and extending between said jack and said club shaft grip assembly.

17. The head-to-shaft separation tool for golf clubs according to claim 15, further including a compression spring disposed between the lifting pad of said jack and said jack force transfer fixture.

18. The head-to-shaft separation tool for golf clubs according to claim 15, further including at least one tensile retraction spring disposed between said jack force transfer fixture and said support frame, urging said jack to a retracted state.

19. The head-to-shaft separation tool for golf clubs according to claim 15, wherein said club shaft grip assembly comprises:

a jaw housing having a front plate and a back plate, each of the plates having a first side and a second side, the front plate having a club shaft slot separating the first side and the second side, each of the sides of the plates having a pair of cam slots formed therethrough, the cam slots extending generally diagonally inwardly and toward said club head stop bracket;

first and second mutually opposed shaft gripping jaws adjustably disposed within said jaw housing between the front plate and the back plate; and a pair of jaw locating pins disposed through each of said jaws and through corresponding ones of the cam slots; whereby movement of said shaft gripping jaws within said jaw housing and towards said club head stop bracket results in movement of said jaws toward one another, thereby securely gripping a golf club shaft placed therebetween.

20. The head-to-shaft separation tool for golf clubs according to claim 19, further including:

a compression spring disposed between each of said shaft gripping jaws and said housing, urging said jaws toward one another; and club shaft protective cushioning material disposed upon each of said jaws.

* * * * *